US012080102B2

(12) United States Patent
    Candela et al.

(10) Patent No.: US 12,080,102 B2
(45) Date of Patent: Sep. 3, 2024

(54) IMAGE PROCESSING FOR IDENTIFICATION OF EMOTIONS, EMOTIONAL INTENSITY, AND BEHAVIORS

(71) Applicant: IDENTIVISUALS S.R.L., Milan (IT)

(72) Inventors: Christian Candela, Milan (IT); Jasna Legisa, Milan (IT)

(73) Assignee: IDENTIVISUALS S.R.L., Milan (IT)

(*) Notice: Subject to any disclaimer, the term of this patent is extended or adjusted under 35 U.S.C. 154(b) by 0 days.

(21) Appl. No.: 18/197,866

(22) Filed: May 16, 2023

(65) Prior Publication Data

US 2023/0360438 A1    Nov. 9, 2023

Related U.S. Application Data

(63) Continuation of application No. PCT/IB2021/062517, filed on Dec. 31, 2021.

(30) Foreign Application Priority Data

Dec. 31, 2020   (IT) .................. 102020000032963

(51) Int. Cl.
    *G06V 10/56*    (2022.01)
    *G06V 20/40*    (2022.01)
    *G06V 40/16*    (2022.01)
    *G06V 40/20*    (2022.01)

(52) U.S. Cl.
    CPC ............ *G06V 40/176* (2022.01); *G06V 10/56* (2022.01); *G06V 20/49* (2022.01); *G06V 40/166* (2022.01); *G06V 40/171* (2022.01); *G06V 40/20* (2022.01)

(58) Field of Classification Search
    CPC ...... G06V 40/176; G06V 10/56; G06V 20/49; G06V 40/166; G06V 40/171; G06V 40/20; G06V 40/174
    USPC .......................................... 382/103
    See application file for complete search history.

(56) References Cited

U.S. PATENT DOCUMENTS

| 2009/0285456 | A1  | 11/2009 | Moon et al. |
| 2012/0002848 | A1* | 1/2012  | Hill ................ G16Z 99/00 382/118 |
| 2017/0245759 | A1* | 8/2017  | Jain ................ A61B 5/163 |
| 2019/0038200 | A1* | 2/2019  | Lee ................. A61B 5/7405 |

(Continued)

OTHER PUBLICATIONS

International Search Report cited in PCT application No. PCT/IB2021/062517, dated May 20, 2022, 3 pages.

(Continued)

*Primary Examiner* — Ali Bayat
(74) *Attorney, Agent, or Firm* — Workman Nydegger

(57) ABSTRACT

A computer system for recognition and identification of emotions receives captured images from an image capture device. The computer system extracts mapping points of the captured images, wherein the mapping points comprises facial points, facial lines, and facial swellings. The computer system measures movements of the facial points, colors of the facial lines, and colors of the facial swellings. The computer system then compares the measurements to a biometric facial template. Additionally, the computer system identifies one or more intensities of emotions based upon the comparison. The computer system then creates a behavioural output signal based upon the identified one or more intensities of emotions in conjunction with a task currently being performed by the one or more individuals.

14 Claims, 3 Drawing Sheets

(56) References Cited

U.S. PATENT DOCUMENTS

| | | | | |
|---|---|---|---|---|
| 2020/0188629 A1* | 6/2020 | Levenberg | ............ | A61N 1/3603 |
| 2020/0342896 A1* | 10/2020 | Kanai | ................. | G06F 18/2413 |
| 2021/0307621 A1* | 10/2021 | Svenson | ............. | A61B 5/7267 |
| 2024/0070251 A1* | 2/2024 | Maizels | .................. | G10L 15/20 |

OTHER PUBLICATIONS

International Search Report and Written Opinion received for PCT Patent Application No. PCT/IB2021/062517, mailed on May 20, 2022, 12 pages.

* cited by examiner

IMAGE PROCESSING FOR IDENTIFICATION OF EMOTIONS, EMOTIONAL INTENSITY, AND BEHAVIORS

CROSS-REFERENCE TO RELATED APPLICATIONS

This application is a continuation of PCT Application Serial No. PCT/162021/062517 filed on Dec. 31, 2021 and entitled "SYSTEM AND CONTROL METHOD FOR HARDWARE AND SOFTWARE DEVICES, BASED ON THE RECOGNITION OF THE EMOTIONS OF A INDIVIDUAL AND ON THEIR INTENSITY, FOR THE INTERPRETATION OF DECISIONS AND BEHAVIOURS," which application claims priority to Italian Patent Application No. 102020000032963 filed on Dec. 31, 2022, both of which applications are expressly incorporated herein by reference in their entirety.

BACKGROUND

Studies on emotional intelligence have shown the role that emotions play in determining quality of (even professional) life and people's behaviour. Nowadays, the tools used to assess the emotional state of people are essentially based on psychological investigations, entrusted to experts, which present, among others, at least two problems: lack of objectivity, being affected by the level of competence and experience of the experts, and lack of immediacy, being usually carried out ex post and, almost always, not in the environment where the person under observation operates.

Therefore, there has long been a need to make the recognition of the emotions of the people automatic, immediate and quick to obtain, both in the case the subjects to be analysed are employees of a company or consumers.

DESCRIPTION

Figure 1:
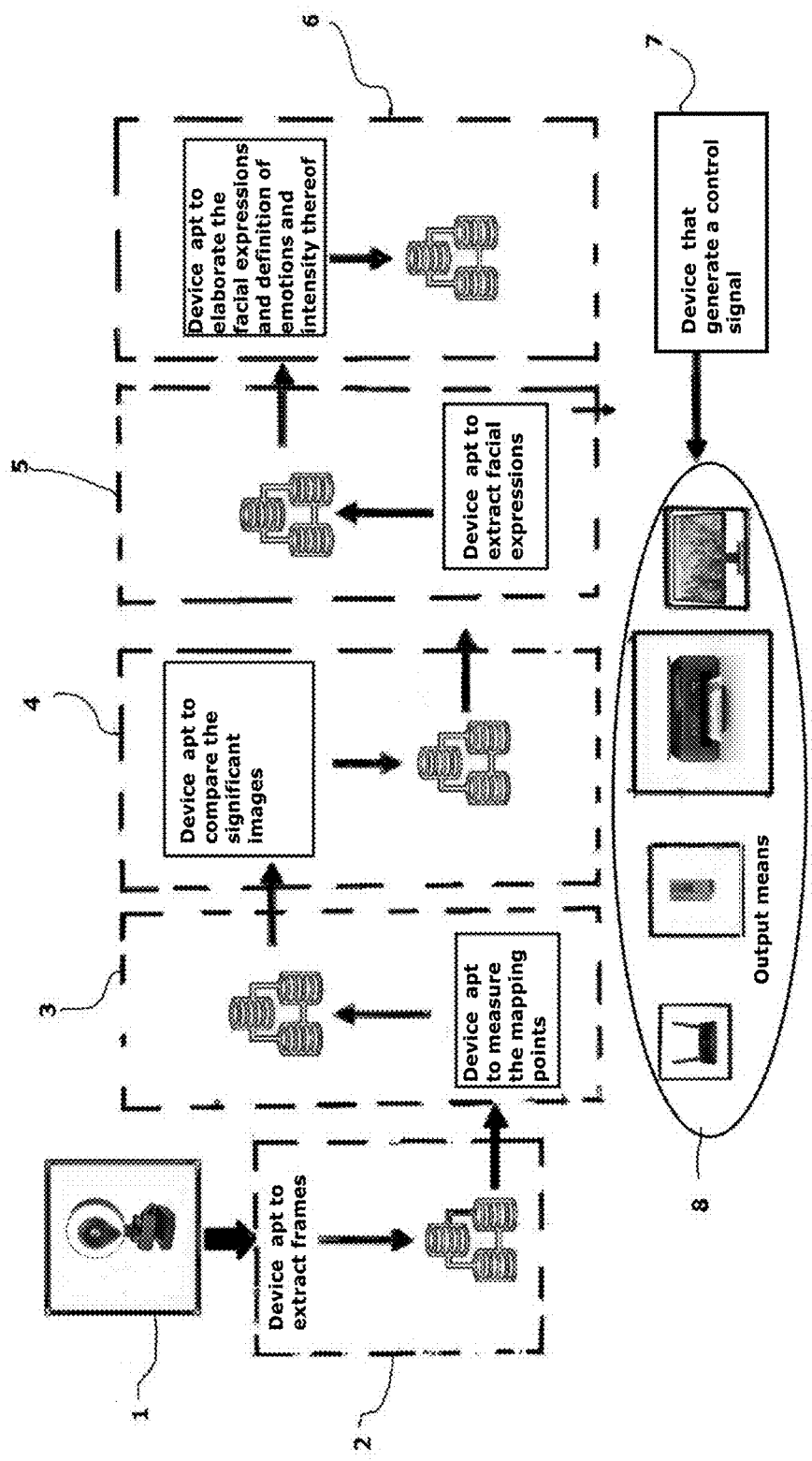
FIG. 1 is a schematic view of the structure of the system according to the invention, wherein the various components are highlighted.

The invention relates to a system and to a control method for hardware and software devices, based on the recognition of the emotions of one or more individuals, on their intensity, and on the elaboration and combination of these elements for the interpretation of decisions and behaviours. Science has shown that the decisions of human beings are often not based on rational parameters but on the emotional states experienced at the moment of decision; neuroscience and cognitive sciences are now being studied and applied also for decisions in the economic and social fields and in the last twenty years two Nobel Prizes have been awarded on these topics to Kahneman and Thaler.

Studies on emotional intelligence have also proven the role that emotions play in determining quality of (even professional) life and people's behaviour.

Nowadays, the tools used to assess the emotional state of people are essentially based on psychological investigations, entrusted to experts, which present, among others, at least two problems: lack of objectivity, being affected by the level of competence and experience of the experts, and lack of immediacy, being usually carried out ex post and, almost always, not in the environment where the person under observation operates.

Therefore, there has long been a need to make the recognition of the emotions of the people automatic, immediate and quick to obtain, both in the case the subjects to be analysed are employees of a company or consumers, by creating a system and control method which collects the needed information at defined moments and places of daily life, processes it with respect to predefined reference factors, and provides for a suitable output signal for carrying out a control, such as switching on/off a hardware device, starting/stopping an application software, writing in a database information, or simply visualizing on paper or screen, the emotional state of the subject.

Further attempts which have been made in the past to automatically monitor the emotional state through algorithms or electronic devices were not effective, both for the accuracy (as they only partially detect the distinctive elements of an emotional state detectable through the face), and—above all—because they do not detect the level of intensity of the emotions, which is a highly significant variable to represent the real state of the person under observation.

Even more relevant for application purposes is the total absence in the art of automatic devices enabling the processing and interpretation in real time of emotions, and their combination into indicators of behaviour and intention, for analytical and predictive purposes.

Object of the present invention is therefore to obtain a real time precise identification of the emotional state of an individual, by means of an automatic device.

Said object is achieved by means of a system and method for controlling devices apt to recognize and identify the emotions of one or more individuals, characterized in that it comprises:
- a capturing device of still or moving images, which transmits all information to a frame extraction device, in real time or following a locally timed recording;
- a device for the extraction and measurement of mapping points of the captured images, provided downstream of said frame extraction device;
- a device for the comparison and recording of images, associated to said device for the extraction and measurement of mapping points such as facial points, lines, and swellings;
- a device for the extraction and storage of facial expressions which is connected to said device for the comparison and recording of images being associated in turn to a device for the processing of emotions and their intensity;
- a device for the processing and combination of emotions and intensities into indicators of behaviour and intention, and their transmission to output means.

Other features, advantages and properties will become evident from the detailed description below of the system and method according to the invention, and from the attached claims.

Figure 2:
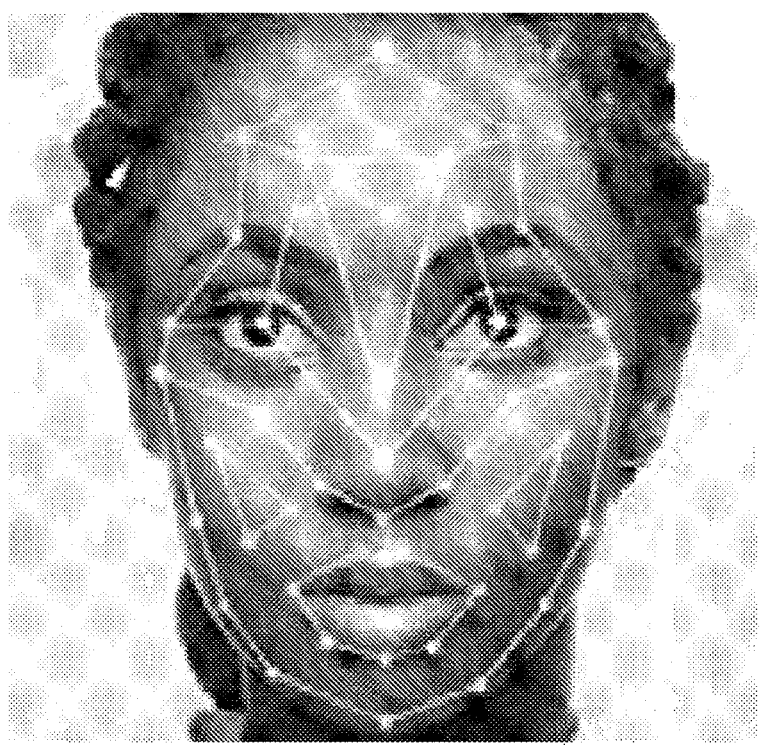
FIG. 2 is a diagram to illustrate a grid of precise analysis of the mapping points, lines, and swellings on an individual, for the system according to the invention.
Figure 3:
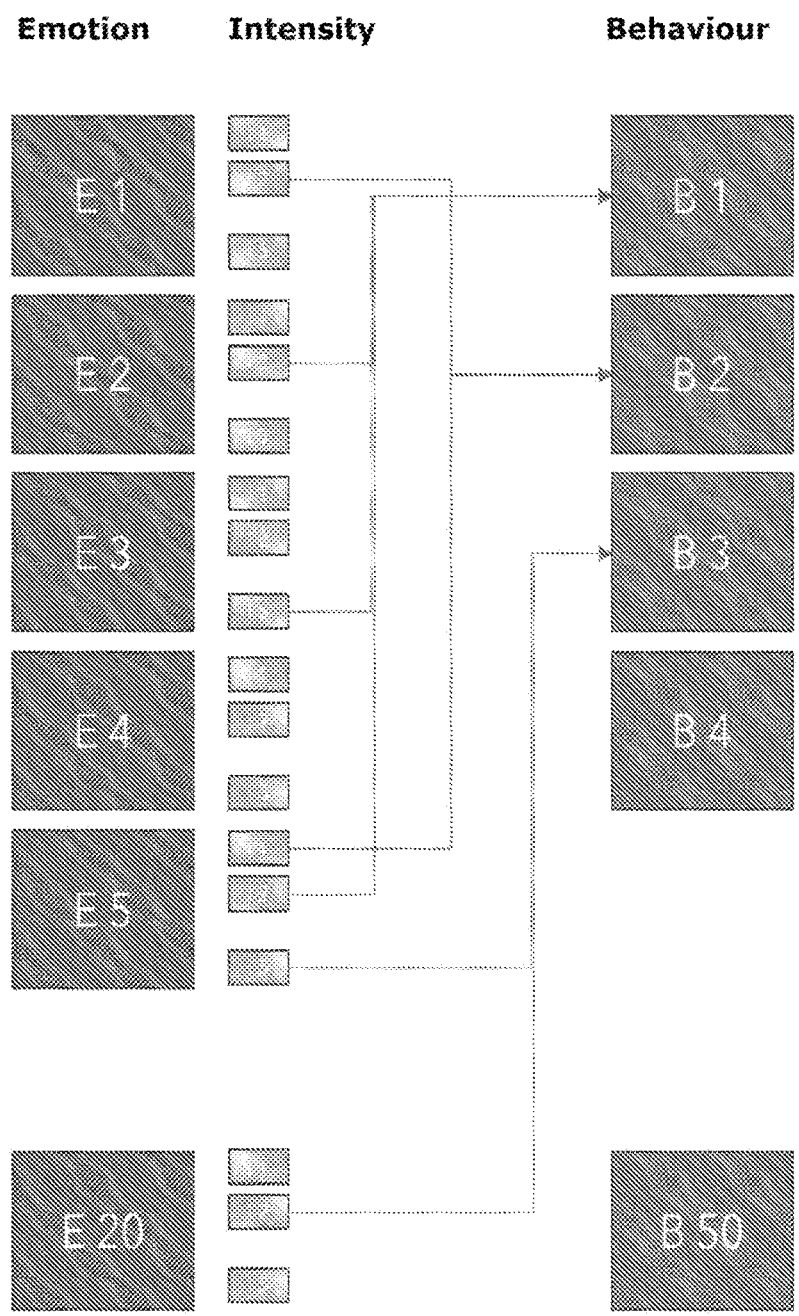
FIG. 3 is a schematic view of the connections provided in the device for the processing and combination of emotions and intensities into indicators of behaviour and intention, and their transmission to output means according to the invention.

FIG. 1 is a schematic view of the structure of the system according to the invention, wherein the various components are highlighted;

FIG. 2 is a diagram to illustrate a grid of precise analysis of the mapping points, lines, and swellings on an individual, for the system according to the invention;

FIG. 3 is a schematic view of the connections provided in the device for the processing and combination of emotions and intensities into indicators of behaviour and intention, and their transmission to output means according to the invention.

The diagram of FIG. 1 reports the elements physically needed to set up the system which substantially consists of a series of interconnected elements located in different physical positions, even remote and distant from each other.

A capturing device of still or moving images 1 is therefore provided, which transmits all information to a frame extraction device 2, in real time or after a local recording. Downstream of such frame extraction device there is a device for the extraction and measurement of mapping points 3 of the captured images and—associated thereto—a device for the comparison and recording of significant images 4, i.e., the images of people who have given consent to the measurement of emotions. From this device the connection for a device for the extraction and storage of facial expressions 5 of the images recorded in the device 4 leaves, to which a device for the processing of facial expressions and the definition of emotions and their intensity 6 is associated. These are the input for the device 7 which generates a control signal based on the interpretation of emotions and their intensity, and on their translation into indicators of behaviour and intention. The thus-constructed signal is sent to output means 8, such as for example a router, a video terminal, a printer, or a server.

In particular, to ensure normal operation, the image capturing device 1 consists of video cameras, possibly provided with microphones, so as to obtain all useful information for subsequent processing. Furthermore, the various devices—mutually connected in cascade, both via cable and via wireless network, as can be clearly seen from FIG. 1—substantially consist of processors of the known art, conditioned for the specific intended function. Finally, the transmission device and the output devices are mere devices known per se in the art, which do not require any specific reprocessing. To the so-constituted system, a remote console, not indicated in FIG. 1 can be added, apt to allow the operator of the control system to manage possible changes in the parameters defining the actual capture of images and sounds, according to the needs of that moment, for example relating to different physical features of the individuals present, or to a different brightness and noisiness of the environment. As it can be seen in FIG. 2, the system takes into consideration a series of points of specific interest, according to a map that aims to consider the points of specific interest for the ongoing investigation. Obviously, such a map is not pre-set, but it automatically fits the physiognomy of the analysed individual, with no requirement to the people to change their attitudes while they are under observation. The identification of the points of interest occurs both in the image capture step and in the processing step.

From FIG. 3 the logic of identifying a specific behaviour is recognised based on the collected information. In particular, it appears that a particular emotion is expressed with a specific intensity: the combination of the various intensities related to various emotions leads to the definition of a specific behaviour. They are therefore logical connections defined by specific algorithms.

In practice, the images (still, or in the form of a video) acquired by the camera 1 are acquired and transmitted to the frame extraction device, i.e., to a processing unit which splits the image flow, and transforms them into frames, i.e., specific single images.

Once the individual frames of interest are identified, they are memorized in the memory unit of said device, in order to have a database of specific frames onto which operate.

Subsequently, according to the operator's instructions, the system sends the memorized frames, therefore considered worthy of further analysis and investigation, to the device for the extraction and measurement of mapping points, wherein series of elements considered essential for the investigation of interest are highlighted in the sent frames, i.e., specific facial areas that can allow, through the subsequent processing described below, to determine the particular emotions of the specific time of acquisition of the frame. Such a process takes place using a selecting method of known and proprietary artificial intelligence algorithms and/or computer vision techniques, and/or specific geometric algorithms depending on the type of regions being analysed. In this way, facial points, lines and swellings are identified, which are classified according to known or proprietary naming systems.

The precise interest in these specific facial elements founds its basis on the information that such facial points, lines, and swellings are unique descriptive elements of each person and are part of the category of so-called "biometric templates" to which, for example, fingerprints and eye colour belong as well. Hence, it is recognized the need to memorize these "biometric templates" which allow on the one hand to identify the person, and on the other hand to proceed with the subsequent analysis, provided in the device for the comparison of significant images. This device compares the elaborations with the Facial Biometric Template, also stored in the device for the extraction and measurement of mapping points, of the people who have given consent to the acquisition and processing of their images in accordance with current regulations, with particular attention to manage sensitive information also based on the regulatory context of the Country of interest. In the case of negative comparison, the frames from which the elaborations were derived are permanently deleted because they refer to people who have not given their consent; if the comparison is positive, the frames from which the elaborations were derived are stored in the device for the extraction and measurement of mapping points.

Subsequently, the system sends the frames contained in the device for the comparison and recording of images into the device for the extraction of facial expressions and their intensity. This operation is carried out measuring the movements of the facial points, and the presence and colour of lines and swellings in the selected frames, according to proprietary mathematical and possibly artificial intelligence algorithms, and comparing them with the individual's Biometric Facial Template, stored in the device for the extraction and measurement of mapping points, so as to build a sort of map of the facial expressions present in the selected frame and of their intensities.

Subsequently, the system sends the facial expressions and their intensity to the device for the extraction and storage of emotions and their intensity, which uses artificial intelligence algorithms and specifically neural networks, storing them internally.

The result of the processing inside the device 6 is transformed into behavioural output signals and other indicators that are a function of the emotions according to different proprietary algorithms depending on the use case; by mere way of example, the cases of use may concern the administration of interactive training content via computer, the measurement of employee engagement and working atmosphere in the workplace, the measurement of the emotional state of people during a remote shopping experience via PC or smartphone, or in store, the measurement of the level of tiredness and attention.

In particular, this type of procedure can be provided in activities such as:
- measurement of participation and interest in distance learning
- behavioural simulators in the field of distance learning
- techniques of leadership development and communication skills based on improvement of the emotional impact
- team building based on emotional gaming
- predictability of purchase and approval rating, otherwise known as shopping experience in retail contexts or in the use of advertising or media
- approval rating in the customer-company relationship (one thinks of contact management, customer service)
- sharing of emotions on social networks
- measurement of employer branding and engagement
- role vs person fit analysis in career selection, development, and management techniques
- management of points of interest and geolocated events based on the emotional reaction of participants/passers-by
- interactive management of events based on the emotional reaction In each of said cases, the algorithm which translates the presence or absence of certain emotions and their intensity into an appropriate output signal is loaded into the device 7 that generates the control signal.

In support of the system and method described above, two artificial intelligence techniques are developed.

For the first technique, the system is supplied with many sample images of the face, printed in A3 size, having a resolution of 600×600 DPI, on each of which the areas to be measured and the facial points, lines and swellings are highlighted. Once set up, they are acquired in Full HD in order to ensure of the quality of the memorized image, so that the size of the face image is about 400×400 pixels. This technique allows the system to artificially learn the technique of detecting the points, lines and swellings present in the facial images, and their colour. Typically, such artificial intelligence engine is provided in the device for the extraction and measurement of mapping points 3.

For the second technique, the system is provided with the same images as before, with the annotation of which facial expressions and emotions are present in the faces, and with what intensity. This technique allows the system to artificially learn and build the matrix of association between emotions and facial expressions, based on neural networks; in this case, the engine is inside the device for the processing of facial expressions and the definition of emotions and their intensity 6.

For each individual who has given consent, the system creates the Facial Biometric Template thereof, through the first technique, by identifying a single document per image and per individual.

Everything is thus ready for analysis in working conditions: the operation substantially proceeds as described above, taking care to let the system acquire the images in a very short period of time, for example of 0.25 seconds or less, since they are frames of video streams. Therefore, the artificial intelligence system has to recognize and process only the faces for which it has information previously collected through the first technique, discarding those for which there was no previous analysis and probably no authorization from the individual; this recognition can also take place by comparing the acquired image with the sample image, using known techniques of identification and biometric authentication of people.

On the validated images, the investigation aims to build the map of facial expressions by comparing the facial points, lines and swellings and their colour to those in the sample images collected in the specific database. The map of facial expressions and their intensity is built considering the physical length of the movement, the direction of the colours and the change of colour in the analysed image and in the sample image.

Once completed the map of facial expressions and their intensity, the extraction of emotions is required, which takes place by applying the second technique.

The measurement of the emotion intensity is processed later, by analysing image after image the variations of the maps of facial expression: the emotions will be the more intense the more intense are the facial expressions representing them, and the more present the same facial expressions are in several consecutive images.

Therefore, the control system described above makes it possible to correlate the detected emotions with the activities carried out by people; therefore, "mathematically defined" information can be obtained by such system, which certainly makes objective the analyses conducted so far through psychological investigations or traditional company surveys based on questionnaires in the case of working place.

The system described above can also be used for alternative activities still having interesting professional implications. For example, in the field of distance learning, the non-verbal interaction between the individual and a simulated interlocutor (avatar or other solution) can be measured in the context of a training system simulating real cases, typically of sale-purchase or customer service, by observing the emotions on the Participant's face, acquired by the camera of the PC or smartphone, and digitally processed through Artificial Intelligence algorithms.

The training system, organized based on a crossroads structure guided by a "gamification" system, allows to advance from a crossroad to another based on the inputs manually or automatically provided by the Participant, until a score or a final result is achieved.

Among the automatic inputs the emotions (sometimes stimulated, sometimes spontaneous) felt by the Participant during the listening of the avatar, detected and then "transmitted" with the methods described herein, can be provided, as well as the voice tone, the recognition of keywords, the semantic recognition of what is said to the avatar itself. In this way, it will be possible to provide for understanding of the emotions for example of the personnel attending a training event, and to evaluate their level of attention, their learning, and their satisfaction with the trainer.

In order to limit the risks of privacy violation, or illegal use by third parties who have violated the security systems, the faces scanned during the activities of the present system are not stored. Much less, we here confirm, sensitive information is tracked.

Finally, it should be remembered that the scope of protection of the solution described herein is not limited to the features of the specific embodiment described above, but to the scope of the attached claims.

The invention claimed is:

1. A computer system for recognition and identification of emotions of one or more individuals from images, the computer system comprising:
- one or more processors; and
- one or more computer-readable media having stored thereon executable instructions that when executed by the one or more processors configure the computer system to:
    - receive captured images from an image capture device;
    - extract mapping points of the captured images, wherein the mapping points comprises facial points, facial lines, and facial swellings;
    - measure, from the mapping points, movements of the facial points, colors of the facial lines, and colors of the facial swellings;
    - compare the measured movements of the facial points, the colors of the facial lines, and the colors of the facial swellings with a biometric facial template;
    - identify one or more intensities of emotions based upon a comparison of the measured movements of the facial points, the colors of the facial lines, and the colors of the facial swellings with the biometric facial template; and
    - create a behavioural output signal that provides indicia of observable and non-observable behaviors based upon the identified one or more intensities of emotions in conjunction with a task currently being performed by the one or more individuals.

2. The computer system as recited in claim 1, further comprising a remote console that is provided for controlling adjustment parameters of the computer system.

3. The computer system as recited in claim 2, further comprising providing the behavioural output signal to a router, a video terminal, a printer, or a server.

4. The computer system as recited in claim 1, wherein the image capture device comprises a video camera.

5. The computer system as recited in claim 4, further comprising instructions to split the images coming from the video camera, to transform every single image into a frame, and to store them in a memory unit of the video camera.

6. The computer system as recited in claim 4, further comprising instructions to highlight and record specific facial areas, such as facial points, lines, and swellings.

7. The computer system as recited in claim 4, further comprising an artificial intelligence algorithm configured to identify and catalogue the emotions of the one or more individuals.

8. A computer-implemented method for recognition and identification of emotions of one or more individuals from images, the computer-implemented method comprising:
- receiving captured images from an image capture device;
- extracting mapping points of the captured images, wherein the mapping points comprises facial points, facial lines, and facial swellings;
- measuring, from the mapping points, movements of the facial points, colors of the facial lines, and colors of the facial swellings;
- comparing the measured movements of the facial points, the colors of the facial lines, and the colors of the facial swellings with a biometric facial template;
- identifying one or more intensities of emotions based upon a comparison of the measured movements of the facial points, the colors of the facial lines, and the colors of the facial swellings with the biometric facial template; and
- creating a behavioural output signal that provides indicia of observable and non-observable behaviors based upon the identified one or more intensities of emotions in conjunction with a task currently being performed by the one or more individuals.

9. The computer-implemented method as recited in claim 8, further comprising a remote console that is provided for controlling adjustment parameters of the computer-implemented method.

10. The computer-implemented method as recited in claim 9, further comprising providing the behavioural output signal to a router, a video terminal, a printer, or a server.

11. The computer-implemented method as recited in claim 8, wherein the image capture device comprises a video camera.

12. The computer-implemented method as recited in claim 11, further comprising splitting the images coming from the video camera, to transform every single image into a frame, and to store them in a memory unit of the video camera.

13. The computer-implemented method as recited in claim 11, further comprising highlighting and recording specific facial areas, such as facial points, lines, and swellings.

14. The computer-implemented method as recited in claim 11, further comprising an artificial intelligence algorithm configured to identify and catalogue the emotions of the one or more individuals.

* * * * *